United States Patent [19]
Stoy et al.

[11] Patent Number: 6,116,259
[45] Date of Patent: *Sep. 12, 2000

[54] METHOD AND APPARATUS FOR MEASURING AND ADJUSTABLY CONTROLLING VAPOR-LIQUID MIXING RATIO AT PIPE JUNCTIONS

[75] Inventors: James Raymond Stoy, Missouri City; James Lindsey Gilbert Schrodt, Houston, both of Tex.; Eric Lee Berger, Bakersfield, Calif.

[73] Assignee: Texaco Inc., White Plains, N.Y.

[*] Notice: Under 35 U.S.C. 154(b), the term of this patent shall be extended for 48 days.

[21] Appl. No.: 08/692,466

[22] Filed: Aug. 5, 1996

[51] Int. Cl.⁷ .............................. E03B 1/00; G05D 11/00
[52] U.S. Cl. ........................ 137/9; 137/101.19; 137/599
[58] Field of Search .................. 137/101.19, 101.21, 137/8, 3, 9, 487.5, 561 A, 599

[56] References Cited

U.S. PATENT DOCUMENTS

| | | | |
|---|---|---|---|
| 2,322,374 | 6/1943 | Lowe | 137/101.19 |
| 2,420,415 | 5/1947 | Bristol | 137/101.19 |
| 3,438,385 | 4/1969 | Nogami | 137/101.19 |
| 3,474,815 | 10/1969 | Beahm | 137/101.19 |
| 4,026,321 | 5/1977 | Kahoe | 137/487.5 |
| 4,112,515 | 9/1978 | Sandow | 137/101.19 |
| 4,277,254 | 7/1981 | Hanson | 137/101.19 |
| 4,522,218 | 6/1985 | Konak | 137/3 |
| 4,838,295 | 6/1989 | Smith | 137/9 |
| 5,146,941 | 9/1992 | Statler | 137/487.5 |
| 5,190,068 | 3/1993 | Philbin | 137/487.5 |
| 5,250,104 | 10/1993 | Berger . | |
| 5,327,772 | 7/1994 | Fredricks . | |
| 5,363,905 | 11/1994 | Rhiel | 137/487.5 |
| 5,415,195 | 5/1995 | Stoy | 137/561 A |
| 5,476,115 | 12/1995 | Lalumandier | 137/101.19 |
| 5,481,968 | 1/1996 | Clem . | |

*Primary Examiner*—John Rivell
*Assistant Examiner*—Joanne Y. Kim
*Attorney, Agent, or Firm*—Harold J. Delhommer; William J. Beard

[57] ABSTRACT

Methods and apparatus are disclosed for adjusting, measuring and controlling the vapor/liquid ratio of wet steam in the output line of a pipe junction in a two phase fluid flow line. The vapor phase and liquid phase of the two phase fluid are separated in the main flow line of the junction and the volume flow rate of each phase measured. The two phases are recombined at the plane of symmetry of the output line of the junction and the liquid flow rate is controlled and varied through an adjustable valve in a liquid phase bypass flow line.

12 Claims, 2 Drawing Sheets

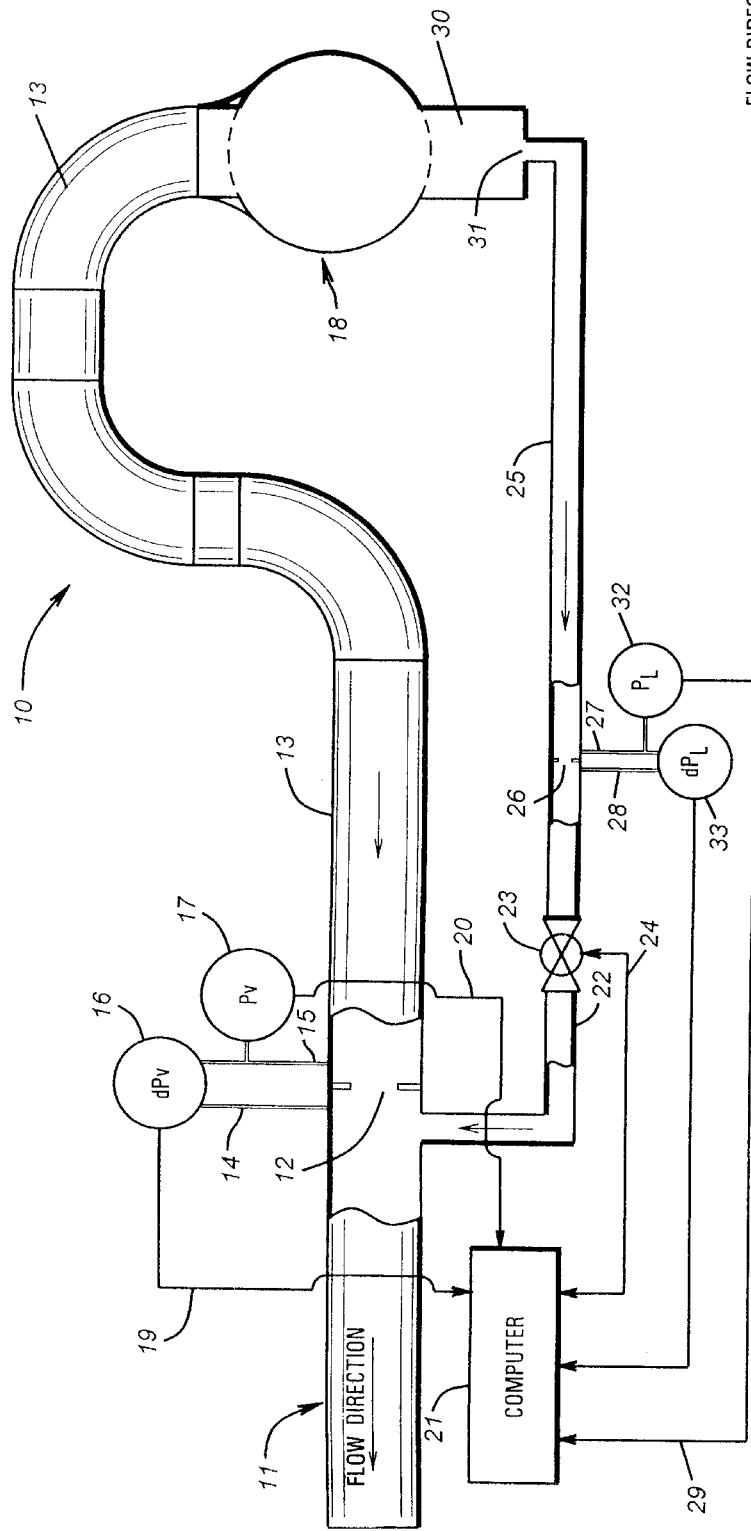
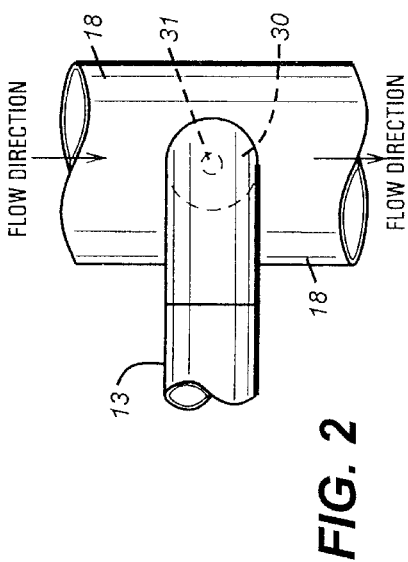
FIG. 1
FIG. 2

METHOD AND APPARATUS FOR MEASURING AND ADJUSTABLY CONTROLLING VAPOR-LIQUID MIXING RATIO AT PIPE JUNCTIONS

FIELD OF THE INVENTION

This invention relates to improvements in two-phase fluid flow systems used in industrial applications such as the steam flooding of oil fields or fluid distribution systems used in oil refineries, factories or the like. More particularly, the invention relates to methods and apparatus for measuring and controlling quantitatively in response to the measurements, the vapor/liquid mixture ratio (steam quality) at piping junctions in such fluid flow systems. While the principal descriptions below will be given in conjunction with steam flow systems, it will be understood that the principles of the invention apply equally well to any two phase fluid flow system.

In most steam flow situations wet steam from a source or generator is distributed through a pipe network to various users. The phenomenon known as "phase splitting" or separation of the liquid and vapor phases of the steam, can occur at pipe junctions. In phase splitting the lighter vapor phase generally moves axially along the pipe at high velocity while the heavier liquid phase tends to become annular in shape and form a liquid film which adheres to and moves along the inside wall of the pipe. The liquid phase is substantially evenly distributed around the internal circumference of the pipe with respect to a vertical diameter of the pipe. When such phase split or separated wet steam encounters a pipe junction, such as a branch T-junction, the result may be steam of differing quality (i.e. vapor/liquid ratio) exiting the respective legs of the junction. This problem has been addressed and various solutions disclosed in U.S. Pat. Nos. 5,415,195; 5,407,274; 5,250,104; 5,218,985; 4,574,837; 4,522,218 and 4,516,986.

In some applications it may become desirable to make use of the phase splitting phenomena to actually measure and control the steam quality at a branch T-pipe junction. The present invention provides methods and apparatus to accomplish just such a measurement and to provide a controllable, adjustable vapor/liquid ratio at a branch T-junction in a wet steam distribution network.

BRIEF DESCRIPTION OF THE INVENTION

In the before referenced U.S. Pat. No. 5,415,195 which is incorporated herein by reference a device, known by a trademark of the assignee of the present invention as the SpliTgator™, is described for equalizing the vapor/liquid ratio or steam quality in the outlet leg of a branch T-junction. In this device in the input leg or main flow line of the T-junction a liquid sump is placed in the bottom portion of the flow line. As the phase split wet steam flows along the main flow line essentially only the vapor phase is passed through to the branch outlet line and the liquid phase is caught by the sump and routed through a liquid bypass tube having its outlet end downstream of a vapor orifice placed in the branch outlet line. The liquid bypass tube is of smaller than main line or branch line pipe diameter and is reconnected into the center of the output leg of the branch T-junction. at the bottom of the outlet leg. The diameter of the liquid bypass tube, the diameter of the vapor orifice in the output line, the diameter of the main flow line and the diameter of the output branch line are all sized to produce a constant controllable steam quality in the output line of the system. In the present invention very small diameter pressure taps are provided upstream and downstream of the vapor orifice in the output line. This enables $\Delta Pv$, the differential pressure across the vapor orifice, and $Pv$, the pressure upstream of the vapor orifice in the vapor phase portion of the output flow line to be repetitively monitored and measured by appropriate pressure transducers. These data are repetitively input to a control computer.

In the liquid bypass tube a liquid orifice plate is provided together with pressure taps upstream and downstream of the liquid orifice plate. This enables $\Delta P_l$ and $P_l$ the differential pressure across the liquid orifice plate, and the pressure in the liquid bypass tube upstream side respectively, to be repetitively monitored and measured by appropriate pressure transducers. These data are also repetitively input to the control computer. Additionally in the liquid bypass tube and located downstream of the liquid orifice plate and its associated pressure taps, there is provided a liquid flow rate control valve (or globe valve) which is remotely controllable by electrical signals and is also connected to the control computer.

The control computer thus repetitively monitors the vapor mass flow rate (which is measured by knowing $\Delta Pv$ and $Pv$ and the input pipe diameter) and the liquid mass flow rate (which is measured by knowing $\Delta P_l$ and $P_l$ and the liquid bypass tube diameter). The control computer can thus send electrical signals to adjust the liquid flow rate control valve, or globe valve, to provide any desired vapor/liquid ratio within the design parameters of the overall steam delivery system in the output line of the branch junction.

The invention will be best understood by reference to the following detailed description thereof, when taken in conjunction with the accompanying drawings. The description and drawings are intended to be illustrative only and not limitative of the invention.

In the Drawings:

BRIEF DESCRIPTION OF THE DRAWINGS

FIG. 1 is a schematic side view partially in section showing the system of the present invention in use at branch T-junction; and FIG. 2 is a schematic top view of a portion of the branch T-junction of FIG. 1.

DESCRIPTION OF THE PREFERRED EMBODIMENT

Figure 3:
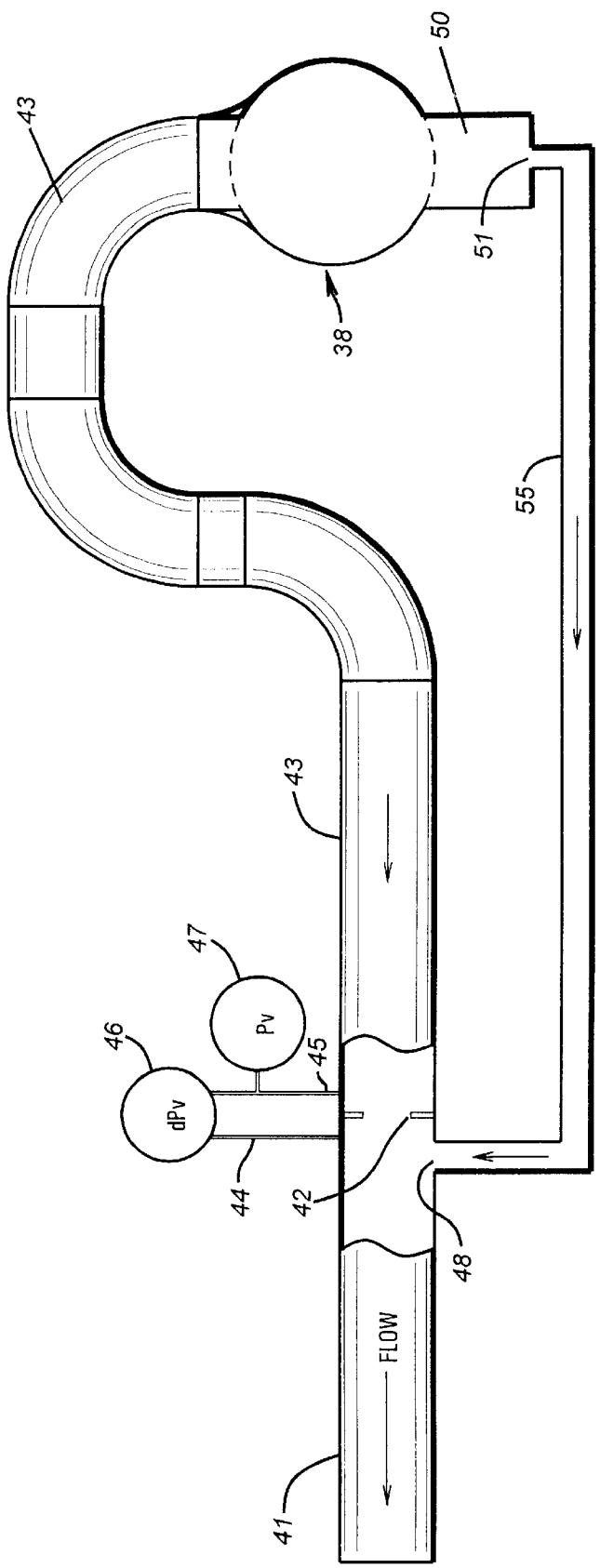
FIG. 3 is a schematic side view, partially in section showing a SpliTgator used as a fluid mass flow rate measurement tool.

Steam generators generally produce wet steam in a vapor/liquid ratio (quality) range of 70% to 80%. In some applications it may be desirable to accurately measure and control steam quality at a given ratio which has been found particularly suitable for that purpose, rather than having the steam quality vary from 0% to 100% depending on multiple user site demand, pipeline geometry, generator consistency, etc. The present invention provides just such measurements to provide a controllable and adjustable steam quality in the face of variations in operating parameters of a wet steam distribution system.

Most steam distribution systems operate in either a segregated flow regime or an annular flow regime. The methods and apparatus of the present invention work equally well in either case. In a segregated flow regime the liquid phase occupies only a small bottom segment of the pipe's cross section while the vapor phase fills the remainder. In the annular flow regime the liquid phase forms an annular film adhesive to the pipe's inner circumference while the vapor phase flows axially in the pipe. Both of these flow patterns are symmetrical with respect to the pipe's vertical diameter or centerline. In the present invention this symmetry is used to promote equal and controllable liquid phase flow in the output leg of a branch T-pipe junction. This results in controllable output steam quality within the design parameters of the system. Moreover measurement of pressure drops in the vapor phase flow and in the liquid phase flow may be made and can be used in a control computer, to vary, in response to these measurements, the flow in the liquid phase flow line.

Referring now to FIGS. 1 and 2 a full blown automatic measurement and control system according to the concepts of the invention is shown schematically. FIG. 1 is a side view, partially in section, of the system and FIG. 2 is a schematic top view of the main flow line portion of the system.

A wet steam flow line 18 is connected via the system of the present invention to a branch T-junction (shown generally as 10) at which it is desired to accurately control the steam quality in the output leg 11. Flow line 18 is provided with a liquid sump 30 and liquid by-pass line 25. The sump 30 effectively separates a portion of the liquid phase of wet steam flowing in line 18 from the vapor phase in either segregated flow or in annular flow in line 18. In the initial portion 13 of the output branch line 11 essentially only a pure vapor phase flow exists. In the outlet flow line 11, small diameter pressure taps 14 and 15 are provided on either side of a vapor orifice 12. A differential pressure transducer 16, which may be of the piezoelectric type if desired, is connected across pressure taps 14 and 15 and generates repetitive differential pressure measurements $\Delta Pv$ signals on line 19 which is connected to a control computer 21. Computer 21 may be any suitable programmable microprocessor based on, for example, the INTEL 80386 or 80486 microprocessor chips and having a suitable memory component and interface hardware to interface with the input and output devices described herein. A Packard-Bell Model 20CD, INTEL 80486 based desktop computer, for example, could be used if desired.

A pressure transducer 17 is connected on the upstream side pressure tap 15 of the vapor orifice 12. The transducer 17 repetitively measures Pv, the pressure in vapor phase only flow line 13 upstream of orifice 12. Signals from transducer 17 are provided via line 20 to computer 21 via appropriate interface hardware internal to the computer 21. Using the known diameter of the flow line 13 and orifice 12, $\Delta Pv$ and Pv, the computer 21 can measure and determine the vapor mass flow rate through line 13 to the output line 11.

On the downstream side of vapor orifice 12 a smaller diameter liquid flow bypass line 25,22 is provided where liquid phase flow can reenter output line 11. Liquid collected from the split phase flow at sump 30 is gravity drawn and pressure forced down into liquid flow line 25, 22. The flow line 25, 22 is provided with a liquid orifice 26 upstream of a liquid flow control valve 23. The liquid flow control valve 23 is connected to computer 21 via conductor 24 and can send and receive control signals on conductor 24 from the computer 21. Signals to computer 21 indicate what flow percentage (of from 0% to 100%) the valve 23 is open. Signals from the computer 21 on line 24 can change or vary the percentage of opening of valve 23 under programmed control of the computer 21 from 0% to 100%.

Liquid orifice 26 is provided with pressure taps 27 and 28 across it. Pressure taps 27 and 28 are connected to a differential pressure transducer 33 which may also be of the piezoelectric type if desired. The differential pressure transducer 33 outputs a repetitive measurement signal representative of $\Delta P_l$, the pressure drop across the liquid orifice 26 in liquid bypass flow line 25, 22. A pressure meter transducer of the same or similar type 32 is also connected to pressure tap 27 on the upstream side of the liquid orifice 26. Transducer 32 provides repetitive measurements of the pressure $P_l$ on the upstream side 25 of the liquid bypass flow line, via line 29 to the control computer 21. Knowing the diameter of the liquid flow line 25, the orifice 26 and the pressure drop $\Delta P_l$ and pressure $P_l$, the computer 21 can measure the liquid valve flow rate in line 22, 25 to the output line 11 via opening 31 of the liquid flow bypass line thereto.

Since the vapor flow rate and liquid flow rate in the junction are both measured and known, so is the vapor/liquid ratio (steam quality) at any time. Thus by comparing the measured steam quality, so measured, with a target or desired value the control computer 21 can generate repetitive control signals on line 24 to open or close liquid valve 23 so as to increase or decrease liquid flow, thereby achieving and maintaining a desired or target value of steam quality in the output leg or line 11. For example, assume it is desired to maintain 60% steam quality in the output line 11. Computer 21 samples $\Delta Pv$, Pv, $\Delta P_l$ and $P_l$ and measures current steam quality at a given instant of time to be 55%. The computer 21 then generates a control signal on line 24 to liquid valve 23, which can be an electrically operated valve or the like, to increase its opening and pass an increased liquid flow in side 22 to output line 11. Liquid from sump 30 of the liquid bypass flow line is reunited with vapor flowing through line 11 at the junction of line 22 and output line 11 at its point of symmetry. This assures known steam quality in the output leg 111 of the junction 10.

Referring now to FIG. 3 a schematic side view, partially in section showing a device according to the concepts of the present invention used as a two phase fluid mass flow rate measurement device. In some applications, it may only be desired to monitor the actual mass flow rate in a two phase fluid flow line such as output line 41 of FIG. 3. Main flow line 38 is provided with a sump 50 having an outlet 51 similar to 31 of FIGS. 1 and 2. A liquid bypass line or tube 55 returns liquid collected in sump 50 via line 55 to output line 41 at junction 48. Junction 48 is located just downstream from vapor orifice 42 which is analogous to orifice 12 of FIG. 1. Essentially only vapor phase fluid flows in branch outlet 43 upstream of orifice 42 because of the geometry and gravity action. Pressure taps 44 and 45 are provided across orifice 42. Assuming that the device is operating as designed (i.e. only vapor phase in line 43) then by measuring the pressure at tap 45 and the differential pressure drop across orifice 42 (i.e. between taps 44 and 45) and knowing the cross section area of output line 41, the mass flow rate of vapor phase (and hence the total mass flow rate, since line 55 is chosen to be a suitable diameter to maintain a desired constant vapor/liquid ratio) is easily determined and can be displayed or one of the meter displays 46 or 47 can be calibrated to reflect this measurement.

The foregoing descriptions may make changes and modifications of the invention apparent to those of skill in the art. It is the aim of the appended claims to cover all such modifications that fall within the true spirit and scope of the invention.

We claim:

1. A system for providing controllable vapor/liquid ratio in the output line of a pipeline having a junction therein having an input leg and at least one output leg, comprising:

an essentially vapor phase only output leg branching from said pipeline;

a vapor orifice in said essentially vapor phase only output leg of said junction and having pressure taps on either side of said orifice;

means for measuring the pressure drop across said vapor orifice $\Delta P_v$ and $P_v$, the pressure on the upstream side thereof;

a second, essentially only liquid bypass leg having a smaller diameter than said essentially vapor phase only output leg and having a liquid sump input on the upstream end thereof located on the lower side of said pipeline and having a liquid orifice in said liquid bypass leg and having an output end thereof located in said essentially vapor phase only output leg downstream of said vapor orifice and means for measuring $P_L$ and $\Delta P_L$ the pressure at said liquid orifice and the pressure drop across said liquid orifice in said liquid bypass leg;

an adjustable flow control valve in said liquid bypass leg downstream of said liquid orifice; and means for adjusting said liquid flow control valve in response to said $\Delta_v$, $P_v$, $\Delta P_L$ and $P_L$ measurements to produce a desired vapor/liquid ratio in said pipeline output line.

2. The system of claim 1 wherein said means for adjusting said liquid flow control valve does so by computing a measured vapor/liquid ratio and comparing it to a desired target vapor/liquid ratio to generate control signals to open or close said liquid flow control valve.

3. The system of claim 2 wherein said means for adjusting said liquid flow control valve comprises a programmable computer and interface hardware.

4. A method for controlling and adjusting the vapor/liquid ratio of a two phase fluid in the output line of a pipe having a junction therein having a single input leg and at least one output leg, comprising the steps of:

essentially completely separating in the input leg of said junction, the vapor phase and the liquid phase of said two phase fluid;

measuring the volume flow rate of the vapor phase flowing in the initial output leg of said junction;

bypassing the flow of the liquid phase of the two phase fluid through a bypass leg having a variable liquid flow rate and rejoining at the output of said bypass leg said liquid phase and said vapor phase at the vertical plane of symmetry of said output line ; and varying the flow of said liquid phase in said bypass leg in response to said measurement of said volume flow rate of said vapor phase to generate a controllable vapor/liquid ratio in said output leg of the junction.

5. The method of claim 4 wherein the step of measuring the volume flow rate of said vapor phase is performed by measuring the pressure drop $\Delta Pv$ across a vapor flow orifice plate and measuring the upstream side pressure Pv, in the output line of said junction.

6. The method of claim 5 wherein said bypass leg adjustable flow rate is provided by providing a liquid flow control valve in said bypass leg, said valve being electrically adjustable and responsive to signals from a control computer.

7. The method of claim 6 wherein said bypass leg is provided, upstream of said liquid flow control valve, with a liquid orifice plate and means for sampling the pressure in said bypass leg on either side of said orifice to produce a $\Delta P_l$ signal and a $P_l$ signal representative of the pressure drop and the upstream side pressure across said orifice.

8. The method of claim 7 wherein a measurement of said volume flow rate of vapor in said output leg of said junction, a volume flow rate measurement of the liquid flow rate of liquid in said bypass leg and a desired target steam quality are used to generate a control signal to said liquid flow control valve.

9. A system for measuring the mass flow rate of a two phase fluid in a fluid flow line output leg at a junction having a branch output leg and a main flow line, comprising:

an essentially vapor phase only output leg branching from said main flow line ;

a vapor orifice in said essentially vapor phase only output leg and having pressure taps on either side of said orifice;

an essentially liquid phase only bypass leg, sized to produce a predetermined known liquid flow rate at a specified pressure drop across said liquid phase only bypass leg, and connected from said main line to a location downstream of said vapor orifice in said essentially vapor phase only output leg: and means for measuring the pressure drop across said vapor orifice and the pressure on the upstream side thereof and for combining said pressure measurements to provide a total mass flow Tate of vapor and liquid downstream of said vapor orifice in said output leg.

10. The system of claim 9 wherein said means for measuring pressure drop comprises piezoelectric transducers.

11. A method for measuring the mass flow rate of a two phase fluid in a fluid flow line output leg at a junction having a branch output leg and a main flow line comprising the steps of;

providing an essentially vapor phase only output leg branching from said main flow line;

providing a vapor orifice in said essentially vapor phase only output leg and providing pressure taps on either side of said orifice;

providing an essentially liquid phase only bypass leg sized to produce a predetermined liquid flow rate at a specified pressure drop across said liquid bypass leg from said main line to a location downstream of said vapor orifice in said essentially vapor phase only output leg; and measuring the pressure drop across said vapor orifice and the pressure on the upstream side thereof and combining said measurements to produce a measurement indicative of the total mass flow rate of vapor and liquid downstream of said vapor orifice in said output leg.

12. The method of claim 11 wherein said pressures are measured by using piezoelectric transducers.

* * * * *